United States Patent
McClamroch et al.

(10) Patent No.: US 9,164,759 B2
(45) Date of Patent: *Oct. 20, 2015

(54) TEST MANAGEMENT DOMAIN ASSET DISCOVERY AND ANALYSIS

(75) Inventors: Kenneth L. McClamroch, Chapel Hill, NC (US); Jennifer G. Becker, New Hill, NC (US); VindoKumar Raghavan, Woburn, MA (US); Peter Sun, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 486 days.

This patent is subject to a terminal disclaimer.

(21) Appl. No.: 13/411,571

(22) Filed: Mar. 4, 2012

(65) Prior Publication Data

US 2012/0216171 A1 Aug. 23, 2012

Related U.S. Application Data

(62) Division of application No. 12/971,646, filed on Dec. 17, 2010.

(51) Int. Cl.
*G06F 9/44* (2006.01)
*G06F 11/36* (2006.01)

(52) U.S. Cl.
CPC .............. *G06F 8/71* (2013.01); *G06F 11/3672* (2013.01)

(58) Field of Classification Search
USPC .......... 717/100–104, 107–108; 707/100–102, 707/5, 1, 706, 610; 714/26–27; 726/25; 719/224
IPC ......................................... G06F 17/30522,8/71
See application file for complete search history.

(56) References Cited

U.S. PATENT DOCUMENTS

| | | | |
|---|---|---|---|
| 6,182,085 B1 * | 1/2001 | Eichstaedt et al. ..................... 1/1 |
| 7,181,454 B1 * | 2/2007 | McClamroch et al. ................ 1/1 |
| 7,526,678 B2 | 4/2009 | Sankaran et al. |
| 7,801,885 B1 * | 9/2010 | Verma ........................... 707/713 |
| 2004/0205076 A1 * | 10/2004 | Huang et al. ................... 707/100 |
| 2005/0114367 A1 * | 5/2005 | Serebrennikov .............. 707/100 |
| 2006/0200484 A1 * | 9/2006 | Tare et al. ..................... 707/102 |
| 2006/0253458 A1 | 11/2006 | Dixon et al. |
| 2007/0240102 A1 | 10/2007 | Bello et al. |
| 2008/0313595 A1 * | 12/2008 | Boulineau et al. ............ 717/101 |
| 2009/0158249 A1 | 6/2009 | Tomkins et al. |
| 2009/0210417 A1 * | 8/2009 | Bennett ............................. 707/5 |
| 2009/0248721 A1 | 10/2009 | Burton et al. |
| 2012/0124547 A1 * | 5/2012 | Halbedel ....................... 717/100 |

* cited by examiner

*Primary Examiner* — Tuan Vu

(74) *Attorney, Agent, or Firm* — Steven M. Greenberg, Esq.; CRGO Law

(57) ABSTRACT

Embodiments of the present invention provide a method, system and computer program product for automated discovery and analysis of test management domain assets. A method for automated discovery of test management domain assets includes crawling different, remotely disposed repositories of test management artifacts and locating test management artifacts in the different, remotely disposed repositories of test management artifacts. The method also includes selecting for each located test management artifact an analyzer configured to process test management artifacts of a type consistent with a type of the located test management artifact. Finally, the unified repository can be queried to produce a result based upon test management artifact data stored in the unified repository, though the test management artifact data had been located in the different, remotely disposed repositories of test management artifacts.

4 Claims, 1 Drawing Sheet

TEST MANAGEMENT DOMAIN ASSET DISCOVERY AND ANALYSIS

CROSS-REFERENCE TO RELATED APPLICATIONS

This application is a Divisional of U.S. application Ser. No. 12/971,646, filed Dec. 17, 2010, currently pending, the entirety of which is incorporated herein by reference.

BACKGROUND OF THE INVENTION

1. Field of the Invention

The present invention relates to software development and more particularly to software testing and test automation.

2. Description of the Related Art

The art of software development extends far beyond a mere coding of a functional specification for a computer program. Modern software development conforms to a lifecycle that begins with the functional specification leading into the formulation of a suitable architecture for an application implementing the functional specification. The lifecycle continues with the physical coding of the application and includes iterative testing and modification cycles to ensure the integrity of the code. Finally, the execution of the completed code can be analyzed to facilitate the further revision of the code to improve the performance of the code.

Traditional testing of a computer program can include the external monitoring of the integrity of the program and the performance of the program, either subjectively based upon end user impression, or objectively based upon independently acquired metrics. In the latter circumstance, the integrity of the program can include the simulation of user interaction with the user interface of the program to ensure the proper operation of the program logic. Likewise, the performance of the program can include an internal monitoring of the code through software test tooling as is known in the art.

Often, to test an application, testing personnel must establish and configure a testing environment. Within the testing environment, a test protocol or test plan can be defined for exercising a computing application. The individual steps and portions of the testing plan, in turn, can be automated through operating system scripts, batch files and the like. In this regard, for a test plan, a typical test cycle can include multiple phases that test a system according to different test cases in order to produce test results to be analyzed and illustrated in assessment reports.

Of note, successful test management requires careful coordination amongst testers and testing teams to ensure activities remain on track and deliverables are met with desired quality. The numerous artifacts associated with test management activities including the test plans, test cases, execution records, defects, assessment reports and the like, often are stored across disparate systems. One substantial inhibitor to efficiency in test management is the ability to find related data. Many hours are spent correlating test cases to requirements and defects to results. Modern test management systems attempt to do this type of correlation and search. However, in most cases the search is manual and time consuming.

BRIEF SUMMARY OF THE INVENTION

Embodiments of the present invention address deficiencies of the art in respect to test management domain asset management and provide a novel and non-obvious method, system and computer program product for automated discovery and analysis of test management domain assets. In an embodiment of the invention, a method for automated discovery of test management domain assets is provided. The method includes crawling different, remotely disposed repositories of test management artifacts and locating test management artifacts in the different, remotely disposed repositories of test management artifacts. The method also includes selecting for each located test management artifact an analyzer configured to process test management artifacts of a type consistent with a type of the located test management artifact.

Finally, the method includes directing the selected analyzer to parse the located test management artifact into data and to store the data into a unified repository. In an aspect of the embodiment, the crawling of the different, remotely disposed repositories of test management artifacts can be scheduled to occur at a time when network traffic is reduced. In any event, once the unified database has been populated with the test management artifact data, an interface to the unified repository can be queried to produce a result based upon test management artifact data stored in the unified repository, though the test management artifact data had been located in the different, remotely disposed repositories of test management artifacts.

In another embodiment of the invention, a test management data processing system can be configured for automated discovery and analysis of test management domain assets. The system can include a host server with at least one processor and memory. The system also can include a unified repository of test management artifact data coupled to the host server. The system yet further can include multiple crawlers disposed in the host server, each having a configuration of program code to crawl a remotely disposed repository of test management artifacts of a particular repository type in order to locate test management artifacts. The system even yet further can include different analyzers, each having a configuration of program code to parse test management artifacts of a particular artifact type located by the crawlers into test management artifact data and to store the test management artifact data into the unified repository. Finally, the system can include a query interface to the unified repository through which queries are applied to the test management artifact data stored within the unified repository. Of note, in one aspect of the embodiment, a scheduler can execute in the host server and schedule the crawlers to crawl the remote repositories at a specified time.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for automated discovery and analysis of test management domain assets. In accordance with an embodiment of the invention, a set of repository crawlers can be activated to crawl different distributed remotely disposed repositories of test management artifacts across a computer communications network. Responsive to the location of a test management artifact by a crawler in a remote repository, a test management artifact analyzer can be selected to correspond to a type of the located test management artifact. The selected analyzer in turn can extract pertinent structured data from the located test management artifact and store the same in one or more records of a unified search repository whilst maintaining a structure amongst the pertinent data within the search repository. Finally, one or more search queries can be applied against the records of the search repository to analyze the test management artifacts. In this way, the test management artifacts of the unified search repository can be analyzed despite the collection and location of the test management artifacts in the different disparate remotely disposed repositories.

Figure 1:
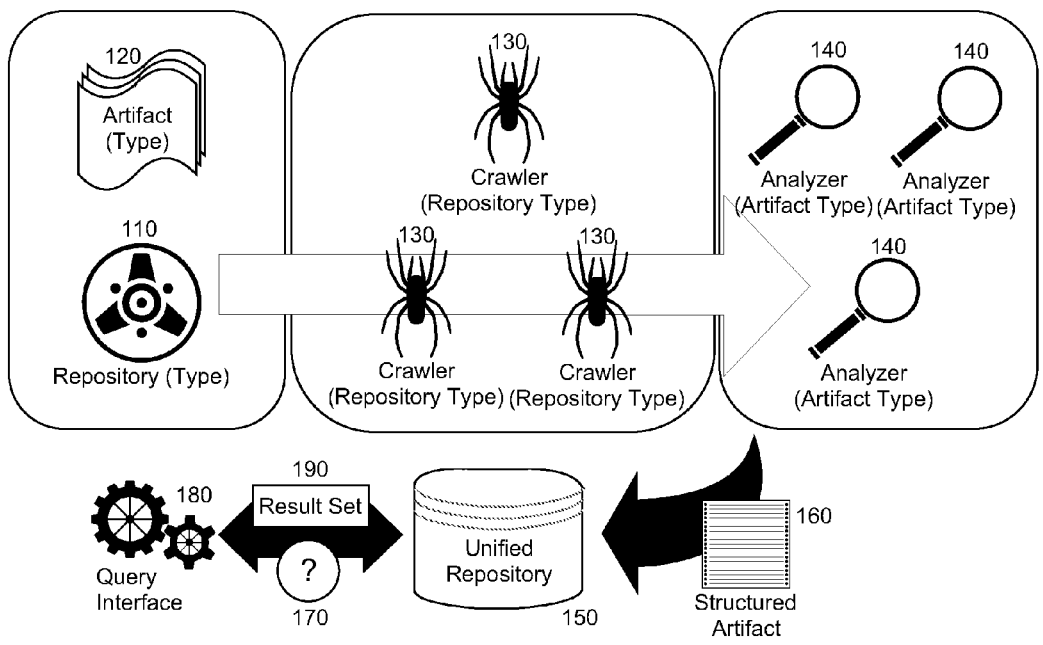
FIG. 1 is a pictorial illustration of a process for automated discovery and analysis of test management domain assets.

In further illustration, FIG. 1 pictorially shows a process for automated discovery and analysis of test management domain assets. As shown in FIG. 1, different repositories 110 of different repository types, such as different data stores managed by different test management tools, can store different artifacts 120 of different artifact types, such as test plans, test cases, test execution records, defects, test results, test assessment reports, and the like. Different crawlers 130, each can be configured to crawl the artifacts 120 of different ones of the repositories 110 of correspondingly different repository types. In response to locating an artifact 120 in a repository 110, a locating one of the crawlers 130 can select an analyzer 140 from amongst a set of analyzers 140, each configured to process a different type of the artifacts 120.

Thereafter, the locating one of the crawlers 130 can direct the selected one of the analyzers 140 to parse the located one of the artifacts 120 into different structured data 160 for storage in a unified repository 150. For example, a fully qualified file name, last update time, textual information such as test plan overviews, test objectives, test owners, test entry and exit criteria, test topologies, coverage summaries including platforms databases, application server runtimes and browsers, test case procedures, defect descriptions, test execution results and test coverage summaries all can be parsed out into the structured data 160 for storage in the unified repository 150. Finally, a query interface 180 can be provided through which queries 170 against the structured data of the unified repository 150 can be processed to return result sets 190. Consequently, correlating artifacts 120 from the different repositories 110—despite the disparate nature of the repositories 110—can be performed through the query interface 180 of the unified repository 150 without requiring manual assembly of the artifacts 120 through separate queries to each of the repositories 110.

Figure 2:
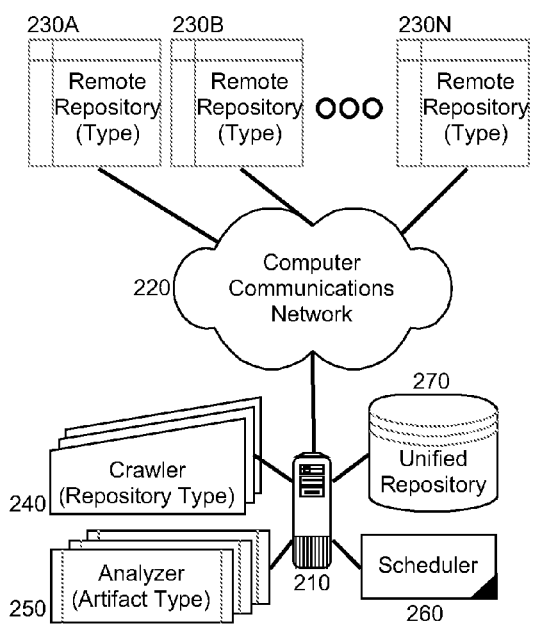
FIG. 2 is a schematic illustration of a test management data processing system configured for automated discovery and analysis of test management domain assets; and, FIG. 3 is a flow chart illustrating a process for automated discovery of test management domain assets.

The process described in connection with FIG. 1 can be implemented within a test management data processing system. In yet further illustration, FIG. 2 schematically shows a test management data processing system configured for automated discovery and analysis of test management domain assets. The system can include a host server 210 with at least one processor and memory configured for communicative coupling to different remote repositories 230A, 230B, 230N of different repository types over computer communications network 220. The host server 210 can support the execution of a scheduler 260. The scheduler 260 can be a computer program that includes program code configured to schedule the activation of different crawlers 240 upon the remote repositories 230A, 230B, 230N, each of the crawlers 240 being enabled to access at least one different repository type.

In this regard, each of the crawlers 240 can include program code configured to access one or more of the repositories 230A, 230B, 230N of a specified repository type and to locate test management artifacts disposed therein. The program code of each of the crawlers 240 further can be configured to respond to the location of a test management artifact in one or more of the repositories 230A, 230B, 230N of a specified repository type by directing a selected one of a set of analyzers 250 to process the located test management artifact. Specifically, each of the analyzers 250 can be configured to parse data of a test management artifact of a particular artifact type and each of the crawlers 240 can be programmed to select a suitable one of the analyzers 250 to process a located test management artifact according to a type of the located test management artifact.

Finally, each of the analyzers 250 can be programmed to parse a test management artifact to identify structured data and to store the structured data once parsed in a unified repository 270. In storing the structured data in the unified repository 270, the relationship between different portions of the structured data can be maintained, for example through the use of a relational database. In this way, queries can be conducted against the structured data for all located test management artifacts in the unified repository 270 without requiring a tedious manual correlation of query results against each of the different remote repositories 230A, 230B, 230N.

Figure 3:
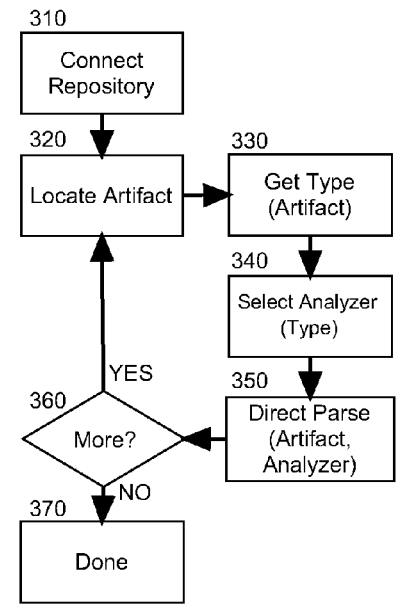

In even yet further illustration of the operation of the crawlers 240, FIG. 3 is a flow chart illustrating a process for automated discovery of test management domain assets. Beginning in block 310, a crawler can connect to a repository in order to locate different test management artifacts. In block 320, a first test management artifact can be located. Once located, a type of the test management artifact can be determined in block 330 and in block 340, an analyzer configured to process artifacts of the determined artifact type can be selected to process the located test management artifact. Accordingly, in block 350 the selected analyzer can be directed to parse the located test management artifact. Thereafter, in block 360 it can be determined whether or not additional test management artifacts remain to be located in the repository. If so, in block 320 a next test management artifact can be located in the repository and the process can repeat through block 330. Otherwise, in block 370 the process can end.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for automated discovery of test management domain assets comprising:

providing a host server, a unified repository of test management artifact data coupled to the host server, and a plurality of different, remotely disposed repositories of test management artifacts;

scheduling a crawl of different, remotely disposed repositories of test management artifacts by different repository crawlers to locate test management artifacts via a single scheduler executing at the host server, the single scheduler directing activation of each different repository crawler to crawl a repository of a type that differs from each other repository crawler to locate test management artifacts, each different repository crawler crawling the repository of the type that differs from each other repository crawler to locate test management artifacts;

directing crawler operations, according to an activation schedule from the single scheduler, comprising:

crawling, one of the different, remotely disposed repositories of test management artifacts by one of the different repository crawlers to locate test management artifacts in response to activation of each different repository crawler by the single scheduler;

locating the test management artifacts in one of the different, remotely disposed repositories of test management artifacts by the one of the different repository crawlers;

determining a type of test management artifact for a located test management artifact located by the one of the different repository crawlers, the type of test management artifact including a test plan, a test execution record, a defect description, and a test assessment report; and selecting for the located test management artifact an analyzer from a set of analyzers, the selected analyzer configured to process test management artifacts of a type consistent with the determined type of test management artifact for the located test management artifact, each analyzer in the set of analyzers processing a type of test management artifact that differs from each other analyzer; and, directing the selected analyzer to parse the located test management artifact into data and to store the data into a unified repository, the data comprising structured data including a fully qualified file name, a last update time, textual information, a test topology, a coverage summary, a test case procedure, a defect description, a test execution result, and a test coverage summary into the unified repository.

2. The method of claim 1, wherein the type of test management artifact further comprises a test case.

3. The method of claim 1, further comprising querying an interface to the unified repository to produce a result based upon test management artifact data stored in the unified repository, but located in the different, remotely disposed repositories of test management artifacts.

4. The method of claim 1, wherein the type of test management artifact further comprises a test result.

* * * * *